United States Patent
Eneroth

(10) Patent No.: US 7,142,148 B2
(45) Date of Patent: Nov. 28, 2006

(54) TOWED DECOY AND METHOD OF IMPROVING THE SAME

(75) Inventor: Anders Eneroth, Linghem (SE)

(73) Assignee: Totalforsvarets Forskningsinstitut, Stockholm (SE)

( * ) Notice: Subject to any disclaimer, the term of this patent is extended or adjusted under 35 U.S.C. 154(b) by 0 days.

(21) Appl. No.: 10/517,303

(22) PCT Filed: Jun. 18, 2003

(86) PCT No.: PCT/SE03/01041

§ 371 (c)(1),
(2), (4) Date: Dec. 9, 2004

(87) PCT Pub. No.: WO04/001443

PCT Pub. Date: Dec. 31, 2003

(65) Prior Publication Data

US 2005/0179577 A1   Aug. 18, 2005

(30) Foreign Application Priority Data

Jun. 19, 2002   (SE) .................................. 0201872

(51) Int. Cl.
- G01S 7/38 (2006.01)
- H04K 3/00 (2006.01)
- G01S 7/00 (2006.01)
- G01S 13/00 (2006.01)

(52) U.S. Cl. ........................... 342/14; 342/13; 342/15; 455/1; 89/1.11

(58) Field of Classification Search ............... 89/1.11; 455/1; 342/5–20, 175, 187
See application file for complete search history.

(56) References Cited

U.S. PATENT DOCUMENTS

| | | | | |
|---|---|---|---|---|
| 4,808,999 A | * | 2/1989 | Toman | 342/15 |
| 5,260,820 A | * | 11/1993 | Bull et al. | 342/9 |
| 5,786,786 A | * | 7/1998 | Small | 342/13 |
| 6,384,765 B1 | * | 5/2002 | Sjostrand et al. | 342/15 |
| 6,683,555 B1 | * | 1/2004 | Carlson et al. | 342/14 |
| 6,833,804 B1 | * | 12/2004 | Atar | 342/10 |
| 2002/0145554 A1 | * | 10/2002 | Lloyd et al. | 342/13 |

FOREIGN PATENT DOCUMENTS

GB   2 303 755 A   2/1997

OTHER PUBLICATIONS

Benson, N.B., "Fiber Optical Microwave Link Applications in Towed Decoy Electronic Countermeasures System," SPIE, vol. 2560/85, pp. 85-92.

* cited by examiner

Primary Examiner—Bernarr E. Gregory
(74) Attorney, Agent, or Firm—Jacobson Holman PLLC

(57) ABSTRACT

A towed decoy arrangement for a craft with a decoy towed by the craft. Threatening signals are received by the craft and a noise signal is generated which is converted up to a frequency which is rapidly attenuated in air and sent to the towed decoy. In the decoy, the received signal is transformed into the noise signal by shifting it to the frequency of the threatening signal. Then the signal is transmitted from the decoy.

15 Claims, 2 Drawing Sheets

TOWED DECOY AND METHOD OF IMPROVING THE SAME

This is a nationalization of PCT/SE03/01041 filed Jun. 18, 2003 and published in English.

BACKGROUND OF THE INVENTION

1. Field of the Invention

The present invention relates to a towed decoy and a method of improving the same. The invention has been developed in efforts of being able to use an existing towed decoy more efficiently by supplementing it in various ways. However, it will just as well be possible to correspondingly build a completely new towed decoy.

2. Description of the Related Art

A towed decoy is a type of offboard decoy which is intended to generate an angular displacement in a threat system, especially towards a homing device. The decoy is towed behind, for instance, an aircraft, and creates a false target which should be more powerful than the fuselage echo. When using a towed decoy, it is important to obtain an angle separation between the target and the decoy. Some kind of manoeuvre is usually required from the aircraft.

Not only aircraft but also vessels may have a towed decoy. However, such decoys are themselves more manoeuvrable than in the case of aircraft. The invention will be presented below with examples involving an aircraft. Equivalent examples may be used for vessels, and a restriction of the scope of protection as a result of the examples is not intended.

There are two types of towed decoy, one in which a complete repeater is implemented in the towed body and one where the towed body comprises a transmitter part only. In this case the signal is supplied from the aircraft.

In the first case, the threat signal is received in the towed body. The decoy then repeats incoming signals and generates a decoy, the size of which depends on the total loop gain in the system. Some kind of amplitude or phase modulation may occur.

In the second case, development of towed decoys is going on all over the world, which receive an RF signal via a fibre optical link from the decoy of the aircraft (mounted inboard or outboard). The problem with insulation between the antennas then decreases drastically, which allows a greater target area to be generated and thus to give greater safety that the decoy attracts the missile. A further advantage is that the decoy of the aircraft normally is more advanced and has a greater selection of forms of jamming. The towed body further comprises fewer electronics in this case, which keeps the cost down, especially if the towed body is hit by the missile or is lost in some other way.

SUMMARY OF THE INVENTION

The present invention gives an advantageous alternative which besides implies that it is easy to supplement older towed decoys of the first type and give them highly improved qualities. This takes place by the invention of a towed decoy arrangement for a craft having a decoy towed by the craft, the craft having an antenna for receiving threatening signals, such as radar pulses, an analysis and noise signal generating device which generates a noise signal and converts the same up to a frequency which is rapidly attenuated in air and an antenna for transmitting the noise signal to the towed decoy. The decoy has an antenna for receiving the signal from the antenna of the craft, a device for transforming the received signal into a noise signal by shifting it to the frequency of the threatening signal and amplifying it, and an antenna for transmitting the noise signal in the direction of the source of the threat signal.

According to further embodiments of the Present invention, the analysis and noise signal generating device includes the jamming equipment of the aircraft for inherent jamming, and the noise signal between the craft and the decoy is higher than 58 Ghz, and particularly about 77 +/−5 GHz.

The present invention is further directed to a method of improving a towed decoy arrangement for a craft, including a decoy towed by the craft and having equipment for receiving threatening signals, such as radar pulses. The method provides for analysing the threatening signals and generating a noise signal and for transmitting the noise signal. The craft is provided with an antenna for receiving the threatening signals, an analysis and noise signal generating device generating a noise signal and converting the same up to a frequency which is rapidly attenuated in air, and an antenna for transmitting the noise signal to the towed decoy. The decoy is supplemented with an antenna receiving the signal from the antenna of the craft, a device which transforms the received signal into a noise signal by shifting it to the frequency of the threatening signal, which is fed to the existing decoy transmitter with an antenna for transmitting the noise signal in the direction of the source of the threat signal.

The method may further include using the jamming equipment of the aircraft for inherent jamming, and selecting the noise signal between the craft and decoy to be higher than 58 Ghz and, preferably about 77+/−5 GHz.

BRIEF DESCRIPTION OF THE DRAWINGS

In the following the invention will be described in more detail with reference to the accompanying drawing in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
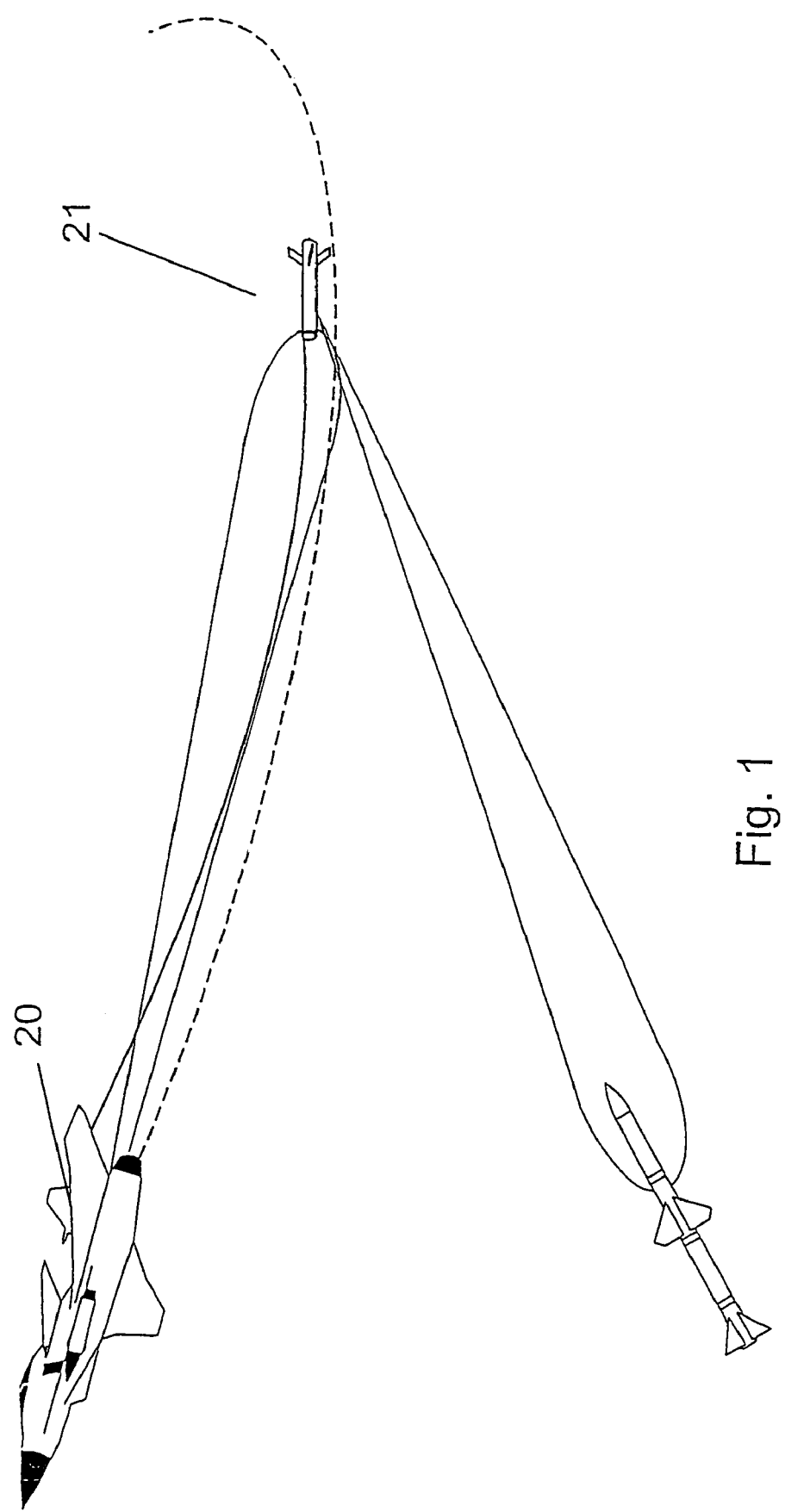
FIG. 1 shows an irradiated towed decoy for aircraft according the invention.
Figure 2:
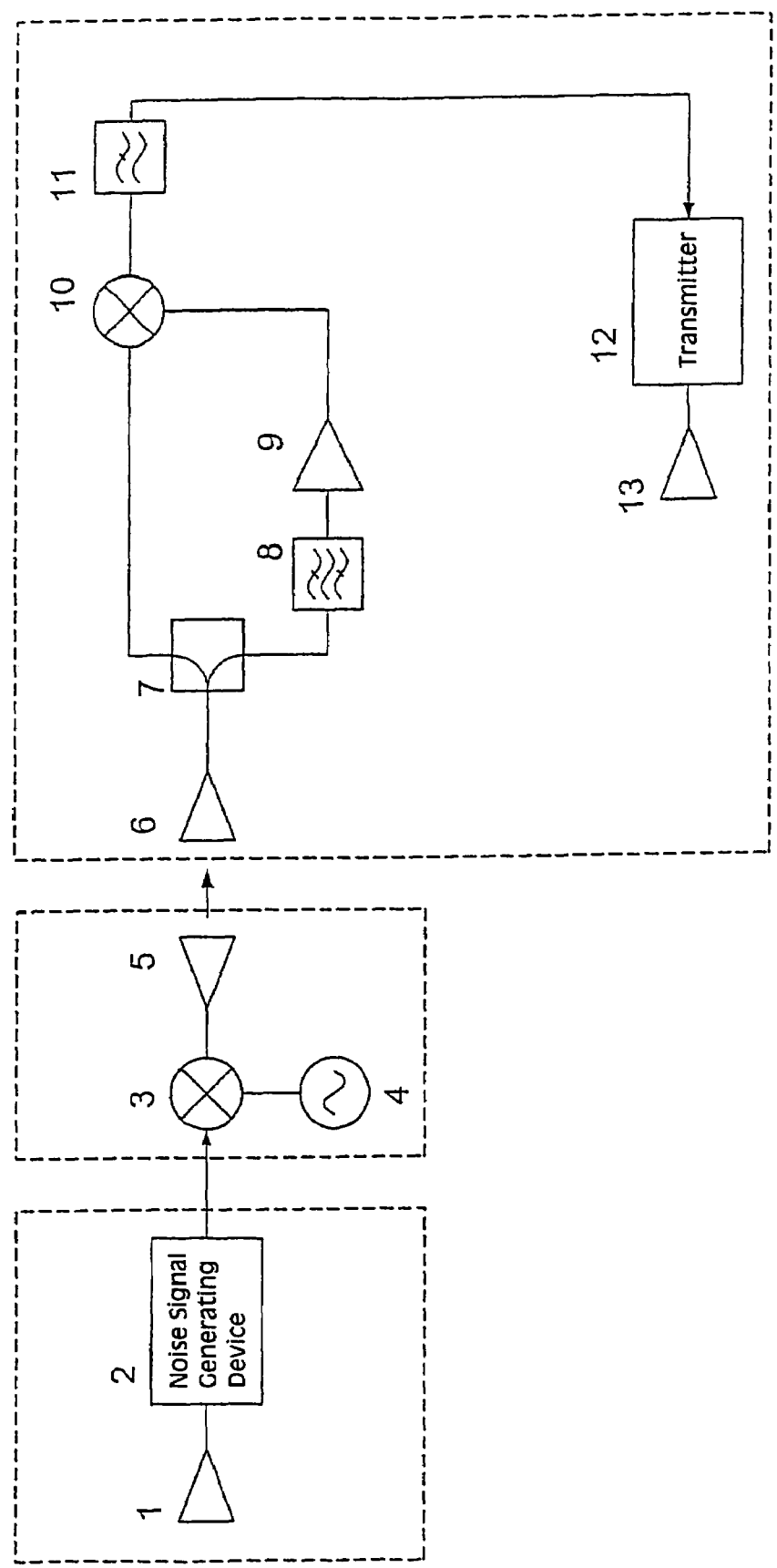
FIG. 2 is a block diagram of an embodiment of the invention.

The inventive towed decoy arrangement for a craft 20 comprises a decoy 21 towed by the craft. FIG. 1 shows what it may look like in the case of aircraft. FIG. 2 shows how the arrangement can be composed. In the craft, here the aircraft, there is an antenna 1 for receiving threatening signals, such as radar pulses, and an analysis and noise signal generating device 2 for self protection. It may either be built in or carried as a pod on a pylon. The generated noise signal is transformed to a frequency which is rapidly attenuated in air and differs from the frequency of the threatening signal. That signal is sent through an antenna 5 to the towed decoy.

The towed body (decoy) is provided with an antenna 6 receiving the signal from the antenna 5 of the craft and a device 7, 8, 9, 10, 11 transforming the received signal back into a noise signal by shifting it to the frequency of the threatening signal. This signal proceeds to an actual decoy transmitter 12 with an antenna 13 for transmitting the noise signal in the direction of the source of the threat signal. Starting from of an older towed decoy of the first type as described above, the latter actual decoy transmitter and the antenna can be the decoy transmitter with antenna that has been used up till now.

FIG. 2 also shows a more concrete example of how a system according to the invention can be designed. The generated noise signal is supplied to a mixer 3 which is connected to a local oscillator 4. The antenna 5 is connected to the third port of the mixer 3. The signal received by the antenna 6 is divided in a power divider 7. One branch is used to regenerate the local oscillator signal via a band-pass filter 8. The filter has a pass band at the frequency of the LO signal and a bandwidth which lets the LO signal pass, but blocks the mixed signal. The regenerated LO signal is amplified in an amplifier 9 and is then fed to a mixer 10. In the mixer, the regenerated LO signal is mixed with the transferred signal from the second port of the power divider. The signal from the mixer is filtered in a low-pass filter 11, and the original signal is regenerated and passed to the actual towed decoy transmitter 12.

The absolutely greatest risk of using an irradiated towed decoy is that the threat can be locked to the signal from the aircraft to the towed body or strong side lobes from the signal. To eliminate this threat, first another frequency for the transmission is used than the frequency of the current threat. The most convenient measure is to convert the signal up in frequency. It is an obvious advantage if the frequency band for the transmission is clearly outside conventional frequency bands for warning systems. Another measure that reduces the risk that the signals between the craft and the towed body will be caught by the threat is to use signals that are rapidly attenuated in air, a typical value being an attenuation by at least 1 dB/km.

It is known that the atmosphere contains different frequency bands with different propagation attenuations. Among frequency bands with good transmission (low attenuation) mention can be made of the various radar bands (L,S,C,X,Ku), certain parts of the mm waveband (26–200 GHz), and also IR bands.

A special frequency band around 60 GHz is of interest for opposite reasons. Attenuation is particularly high for this band and allows only short communication distances between transmitter and receiver at this frequency. The millimetre waveband above 58 GHz is of interest for use of links that are difficult to detect, but there are not very many components on the market. This means that the few components that are available are usually very expensive. Also higher frequencies are of interest, since monitoring systems operating at these high frequencies are most unusual.

A further advantage of the millimetre waveband is that the transmitted bandwidth is great in absolute bandwidth, but small as relative bandwidth. The bandwidth that is probable in a tactical scenario is between 8 and 18 GHz. 10 GHz at 77 GHz means a relative bandwidth of 13%, which is not very much. As comparison, the relative bandwidth for a 10 GHz signal at the X and Ku band is about 77%. The limited relative bandwidth implies, inter alia, that a system may be fairly flat in frequency response etc.

The band around 77 GHz is also special since it is used for car radar and therefore hardware is becoming available at competitive prices. In a particularly advantageous embodiment of the invention, a signal of the frequency 77±5 GHz is therefore used.

An important parameter regarding the radiating antenna is the lobe width. Of course, it must be ensured that the lobe lies on the towed body. At the same time, it is desirable not to propagate signals more than necessary. For a given aperture size, it is generally so that the higher the frequency, the narrower is the lobe. For 77 GHz, the aperture will be very small, which is a great advantage for the towed target.

The amplification for an antenna can be calculated when the lobe angles are known using the following formula (rule of thumb):

$$G \approx \frac{30000}{\theta_{az} \cdot \theta_{el}}$$

$\theta_{az}$ Beam width in azimuth [°]
$\theta_{el}$ Beam width in elevation [°]

With values inserted for antenna coverage of ±10° in each plane an antenna gain of about 18 dB is obtained.

The amplification for horn antennas is calculated using the following formula:

$$A_{eff} = \frac{\lambda^2 \cdot G}{4\pi \cdot \eta}$$

$A_{eff}$ Effective antenna area
$\lambda$ Wavelength
G Antenna gain
$\eta$ Antenna efficiency (about 0.6 for square horn antennas)

With inserted values for 77 GHz, the aperture area will be about 1.5 cm².

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A towed decoy arrangement for a craft comprising a decoy towed by the craft, said craft having a first antenna for receiving threatening signals, an analysis and noise signal generating device which generates a noise signal and converts said noise signal up to a frequency which is rapidly attenuated in air and a second antenna for transmitting said noise signal to the towed decoy, said decoy including a third antenna receiving the signal from the second antenna of the craft, a device transforming the received signal into a noise signal by shifting said received signal to the frequency of the threatening signal and amplifying said received signal, and a fourth antenna transmitting the noise signal in the direction of the source of the threat signal.

2. The towed decoy arrangement as claimed in claim 1, wherein the analysis and noise signal generating device includes jamming equipment of the aircraft.

3. The towed decoy arrangement as claimed in claim 2, wherein the noise signal between the craft and decoy is higher than 58 GHz.

4. The towed decoy arrangement as claimed in claim 1, wherein the noise signal between craft and decoy is higher than 58 GHz.

5. The towed decoy arrangement as claimed in claim 4, wherein the noise signal between craft and decoy is 77±5 GHz.

6. A method of improving a towed decoy arrangement for a craft towing a decoy and having equipment for receiving threatening signals, for analysing the same and generating a noise signal and for transmitting the noise signal, said method comprising the steps of:
  providing the craft with an antenna for receiving the threatening signals;
  generating, with an analysis and noise signal generating device, a noise signal and converting the same up to a frequency which is rapidly attenuated in air;
  transmitting said noise signal to the towed decoy; receiving, by the decoy, the signal transmitted from the the craft;
  transforming the received signal into a noise signal by shifting said received signal to the frequency of the threatening signal; and
  transmitting, by the decoy, the noise signal in the direction of the source of the threat signal.

7. The method as claimed in claim 6, wherein the step of generating uses the jamming equipment of the aircraft.

8. The method as claimed in claim 7, wherein the noise signal between the craft and decoy is selected to be higher than 58 GHz.

9. The method as claimed in claim 6, wherein the noise signal between the craft and decoy is selected to be higher than 58 GHz.

10. The method as claimed in claim 9, wherein the noise signal between the craft and decoy is selected to be 77±5 GHz.

11. A towed decoy arrangement comprising a craft towing a decoy, said craft including an antenna for receiving threatening signals and for sending signals, an analysis and noise signal generating device which generates a noise signal and converts the same up to a frequency which is rapidly attenuated in air, said craft transmitting said noise signal to the towed decoy, said decoy having an antenna for receiving the signal from the craft and a device for transforming the received signal into a noise signal by shifting said received signal to the frequency of the threatening signal, said decoy amplifying and transmitting said noise signal in the direction of the source of the threat signal.

12. The towed decoy arrangement as claimed in claim 11, wherein the analysis and noise signal generating device includes the jamming equipment of the aircraft.

13. The towed decoy arrangement as claimed in claim 12, wherein the noise signal between the craft and decoy is higher than 58 GHz.

14. The towed decoy arrangement as claimed in claim 11, wherein the noise signal between the craft and decoy is higher than 58 GHz.

15. The towed decoy arrangement as claimed in claim 14, wherein the noise signal between craft and decoy is 77+/−5 GHz.

* * * * *